United States Patent
Severinsson

(10) Patent No.: US 10,843,674 B2
(45) Date of Patent: Nov. 24, 2020

(54) DISC BRAKE ACTUATOR FOR A VEHICLE

(71) Applicant: Haldex Brake Products Aktiebolag, Landskrona (SE)

(72) Inventor: Lars Mattis Severinsson, Hishult (SE)

(73) Assignee: HALDEX BRAKE PRODUCTS AKTIEBOLAG, Landskrona (SE)

( * ) Notice: Subject to any disclaimer, the term of this patent is extended or adjusted under 35 U.S.C. 154(b) by 0 days.

(21) Appl. No.: 16/222,221

(22) Filed: Dec. 17, 2018

(65) Prior Publication Data
US 2019/0118790 A1    Apr. 25, 2019

Related U.S. Application Data

(63) Continuation-in-part of application No. PCT/EP2017/064462, filed on Jun. 13, 2017.

(30) Foreign Application Priority Data

Jun. 20, 2016   (EP) .................................... 16175327

(51) Int. Cl.

| | |
|---|---|
| *B60T 13/74* | (2006.01) |
| *F16D 65/18* | (2006.01) |
| *F16D 55/226* | (2006.01) |
| *F16D 121/24* | (2012.01) |
| *F16D 125/36* | (2012.01) |

(Continued)

(52) U.S. Cl.
CPC .......... *B60T 13/746* (2013.01); *B60T 13/741* (2013.01); *F16D 55/226* (2013.01); *F16D 65/18* (2013.01); *F16D 65/183* (2013.01); *F16D 2121/24* (2013.01); *F16D 2125/36* (2013.01); *F16D 2125/40* (2013.01); *F16D 2127/02* (2013.01)

(58) Field of Classification Search
CPC ...... B60T 13/746; B60T 13/731; F16D 65/18; F16D 2125/40
See application file for complete search history.

(56) References Cited

U.S. PATENT DOCUMENTS

| | | | |
|---|---|---|---|
| 5,881,847 A | 3/1999 | Sherman, II | |
| 6,264,011 B1 * | 7/2001 | Zernickel | F16D 65/18 |
| | | | 188/156 |
| 6,714,848 B2 | 3/2004 | Schubert et al. | |

(Continued)

FOREIGN PATENT DOCUMENTS

| | | |
|---|---|---|
| DE | 198 53 721 A1 | 6/1999 |
| DE | 198 50 923 A1 | 5/2000 |

(Continued)

OTHER PUBLICATIONS

PCT International Search Report and Written Opinion in co-pending related PCT Application No. PCT/EP2017/064462, dated Mar. 6, 2018.

*Primary Examiner* — Vishal R Sahni
(74) *Attorney, Agent, or Firm* — Thomas | Horstemeyer, LLP

(57) ABSTRACT

The invention relates to a disc brake actuator (2) for a vehicle. The disc brake actuator (2) comprises an electrical drive (4) and a transmission unit (11) which is driven by the electrical drive (4). The transmission unit (11) comprises a ramp transmission system (12) and a threaded transmission system (13). The ramp transmission system (12) and the threaded transmission system (13) are arranged in series in the force flow of the transmission unit (11).

25 Claims, 12 Drawing Sheets

(51) Int. Cl.
　　　*F16D 125/40*　　　(2012.01)
　　　*F16D 127/02*　　　(2012.01)

(56) References Cited

U.S. PATENT DOCUMENTS

| | | | |
|---|---|---|---|
| 6,749,044 B2 | 6/2004 | Boisseau | |
| 7,490,703 B2 * | 2/2009 | Maehara | F16D 65/18 188/71.9 |
| 10,066,692 B2 | 9/2018 | Sandberg | |
| 2007/0227838 A1 * | 10/2007 | Shigeta | F16D 65/18 188/72.7 |
| 2012/0145491 A1 | 6/2012 | Hyun | |
| 2013/0098719 A1 * | 4/2013 | Furutani | F16D 49/00 188/77 R |
| 2014/0090933 A1 * | 4/2014 | Sakashita | F16D 55/226 188/72.4 |
| 2016/0032994 A1 | 2/2016 | Sakashita et al. | |
| 2016/0333951 A1 * | 11/2016 | Lee | F16D 65/18 |
| 2017/0343065 A1 * | 11/2017 | Okada | F16D 55/08 |
| 2018/0079403 A1 * | 3/2018 | Masuda | F16D 66/00 |

FOREIGN PATENT DOCUMENTS

| | | |
|---|---|---|
| DE | 101 18 871 A | 10/2002 |
| DE | 103 53 695 A1 | 5/2004 |
| DE | 10 2006 033 333 A1 | 8/2007 |
| GB | 2 421 061 A | 6/2006 |
| JP | 2001 041269 A | 2/2001 |
| WO | 98/39576 A | 9/1998 |
| WO | 2014/016672 A1 | 8/2007 |

* cited by examiner

DISC BRAKE ACTUATOR FOR A VEHICLE

CROSS REFERENCE TO RELATED APPLICATIONS

This application is a continuation in part of International Application PCT/EP2017/064462 with an international filing date of Jun. 13, 2017 and claiming priority to European Patent Application No. EP 16 175 327.2 entitled "Disc Brake Actuator for a Vehicle", filed on Jun. 20, 2016.

FIELD OF THE INVENTION

The present invention relates to a disk brake actuator used in a vehicle, in particular
- a commercial vehicle,
- a vehicle driven solely by electrical energy and/or
- a hybrid vehicle driven both by electrical energy as well as by a combustion engine, to mention only some examples. The disc brake actuator serves in particular
- for providing an actuation force (which also covers an actuating torque),
- providing a translational movement and brake force (directly or indirectly) applied to a brake pad coupled to the disc brake actuator,
- increasing the actuating force to an output force or brake force by a suitable transmission ratio,
- considering a clearance between brake pads and a brake disc,
- considering an increasing wear of the brake pads during the lifetime of the same and/or
- providing a suitable force-transfer-characteristic.

A disc brake actuator of the present type is coupled to a disc brake of any conventional type.

BACKGROUND OF THE INVENTION

JP 2001 041269 A discloses a brake device wherein brake pads are actuated by a piston which is driven by a ramp system. The ramp system comprises a rotor. The rotor is rotatably supported by a housing of the brake device and the piston. The rotor has a translational degree of freedom relative to the housing. The translational movement of the rotor is transferred by a thrust bearing to the piston. Balls building rolling elements are interposed between a front face of the rotor and the housing. The balls roll along ramp surfaces formed by the housing so that the rotational movement of the rotor is transformed to a translational movement along the rotational axis of the rotor leading to the actuation of the piston and the brake pads. The ramps of the housing comprise portions with different inclination angles. A portion with a large inclination angle can be used for rapidly passing through a pad clearance, whereas portions with smaller inclination angles can be used for performing the braking function.

U.S. Pat. No. 6,749,044 B2 discloses a brake disc with a calliper wherein a piston biasing the movable brake pad can be actuated both by hydraulic means as well as by a parking brake mechanism. The parking brake mechanism comprises a rotor carrying an arm rotated by a parking cable. A moving plate is coupled to the piston and fixed against rotation but movable in axial direction together with the piston. Three balls evenly distributed in circumferential direction are trapped between the moving plate and the rotor. The moving plate comprises ramp surfaces so that a ramp system is formed which transforms a rotational movement of the rotor into a translational movement of the moving plate, the piston and the brake pad. Here, the ramp surfaces have an inclination angle decreasing with progressing rotation of the rotor.

WO 98/39576 A1 corresponding to U.S. Pat. No. 5,881,847 A discloses a disc brake assembly with a hydraulically actuated piston carrying one brake pad. An adjusting unit is provided for a compensation of wear of the brake pads. The piston is mechanically coupled to an additional parking piston. By the rotation of a parking lever it is possible to move the parking piston in axial direction leading to a parking brake function. The transformation of a rotational movement of the parking lever to a translational axial movement of the parking piston is provided by a transmission unit comprising a rotor mounted to the parking lever and an end plate fixed against rotation but movable in axial direction and pressed in axial direction against the parking piston. Toggle rods are linked for being pivoted in their end regions both to the rotor and to the end plate. A rotation of the rotor leads to a change of the orientation of the toggle rods resulting in a change of the distance between the rotor and the end plate for providing the parking brake function.

DE 101 18 871 A1 discloses a brake actuator wherein a threaded drive shaft is driven via a transmission by an electric motor. The thread of the drive shaft meshes with a threaded nut. A front face of an annular shoulder of the nut comprises a ramp surface. The drive shaft and the nut are accommodated in a brake piston having an U-shaped longitudinal cross-section. The front face of the base leg of the U of the brake piston which faces towards the nut comprises a ramp surface. Cylindrical rollers are interposed between the ramp surfaces of the brake piston and of the nut. Due to the bias of the nut in axial direction by a pressure spring via a disc and an axial roller bearing the cylindrical rollers are clamped with a contact force between the ramp surfaces. The brake piston is supported by a brake housing with a translational degree of freedom towards a brake disc, whereas the brake piston is fixed against rotation. When applying the brake by driving the electric motor in the beginning for small brake forces the cylindrical rollers will not roll along the ramp surfaces so that the nut moves in axial direction without any rotation. The axial rotation of the nut leads to a movement of the brake piston towards the brake disc, wherein the inclinations of the threads of the drive shaft and the nut determine the relation between the angle of rotation of the drive shaft and the movement of the brake piston towards the brake disc. For an increased brake force, the cylindrical rollers start to move along the ramp surfaces, whereas there is no longer a relative movement between the drive shaft and the nut. In this case the relation between the rotation of the drive shaft and the movement of the brake piston towards the brake disc depends on the inclination of the ramp surfaces. When releasing the brake, first the rollers roll along the ramp surfaces. In the end of this part of the brake release stroke the cylindrical rollers abut ramp shoulders with a coinciding initiation of the relative movement between the nut and the drive shaft. DE 101 18 871 A1 also suggests to use a planetary gear set as a transmission between the electric motor and the drive shaft.

GB 2 421 061 A corresponding to U.S. Pat. No. 7,490,703 B2 relates to a conventional hydraulic service brake device with integrated parking brake function. In a first operational mode a piston with associated brake pad can be biased by fluidic service brake pressure towards a brake disc. An adjuster assembly serves for compensating for wear of brake pads and also for preventing excessive adjustment. The adjuster assembly is of a reversible screw type including an adjusting spindle having a reversible screw, an adjusting sleeve threaded on the spindle, a bearing for supporting the angular movement of the adjusting sleeve and a biasing spring. When wear of the brake pads exceeds a predetermined level, the adjusting sleeve is angularly moved relative to the adjusting spindle to advance. When the braking operation is cancelled, a retracted position of the piston advances thereby compensating for wear of the brake pads. When an excessive braking fluid pressure is applied to the piston, the adjusting sleeve cannot be angularly moved relative to the adjusting spindle. The adjusting spindle then moves forward together with the adjusting sleeve against a spring force of the spring so that the excessive adjustment is prevented. In another operational mode, the brake is applied by a parking brake operating mechanism comprising a parking lever rotated by a brake wire and a cam shaft. The rotation of the cam shaft is transmitted by rollers interposed between ramp surfaces of the cam shaft and a rear surface of the adjusting spindle as well as between cam surfaces of the cam shaft and the housing.

US 2012/0145491 A1 discloses a brake device, wherein an electric motor directly drives a ramp transmission system. Here, the ramp transmission system comprises a rotating ramp disc driven by the electric motor, a non-rotating ramp disc which can be displaced axially and a rolling ball interposed between the ramp surfaces. The axial movement of the non-rotating ramp disc is directly transmitted to a brake piston and the associated brake pad. A threaded transmission system is interposed between the non-rotating ramp disc and the brake pad. The threaded transmission system does not serve for producing the brake stroke but for adjusting wear of the brake pads.

DE 198 50 923 A1 corresponding to U.S. Pat. No. 6,264,011 B1 discloses a brake device, wherein a spindle is attached to the brake pad. The spindle is supported for a translatory movement correlating to the brake stroke but fixed against rotation. The spindle meshes with a nut which is supported for both moving in translational direction as well as rotating around the spindle. The nut comprises a shoulder forming a ramp disc. A driven ramp disc is directly coupled to the rotor of an electric motor. Rolling bodies held in a cage are interposed between the ramp discs. The ramp discs each comprise a recess and ramp surfaces for the rolling body. Due to the bias by a pressure spring, the rolling bodies are clamped between the ramp discs. At the beginning of the brake stroke, the ramp discs are rotated unisono by the electric drive. Accordingly, the rotation of the ramp disc of the nut (which corresponds to the rotation of the rotor of the electric drive) is transmitted by the threaded connection between the nut and the spindle to an axial movement of the spindle with the brake pad towards the brake disc. When reaching a threshold of the brake force, the rolling movement of the rolling body between the ramp discs initiates, wherein there is no longer a relative rotational movement between the nut and the spindle. When releasing the brake, first the rolling bodies move back to their original position, whereas in a subsequent brake release phase the nut is returned into its original rotational position relative to the spindle. Independent on any existing wear of the brake pads, the rolling bodies will in each case return to their initial positions, whereas any wear can be compensated by the threaded contact between the nut and the spindle. The threshold for switching between the different brake phases can be defined by the inclination of the ramp surfaces and by the depth of the recesses, wherein the rolling bodies are arranged in their initial positions. DE 198 50 923 A1 also includes the (not further specified) indication that the used principle might be inverted by using a nut being blocked against rotation and a rotating spindle.

DE 103 53 695 A1 corresponding to U.S. Pat. No. 6,714,848 B2 discloses a threaded transmission system with an axially fixed but rotatably mounted nut. The nut is driven by a gear which is directly mounted to the driving shaft of an electric motor. At the beginning of a brake stroke, the driven rotation of the nut leads to an axial movement of the spindle. The axial movement of the spindle is directly transferred by a ramp transmission system to the corresponding movement of a brake piston and the associated brake pad. The threaded transmission system is blocked when a threshold of the brake force is exceeded. At this point there is a relative movement between ramp discs of the ramp transmission system. Here, the rotational angle of the ramp discs is limited by an abutting rotational contact of stop elements of the two ramp discs. The front face of one ramp disc facing towards the brake pad has a spherical contour accommodated in a corresponding spherical contour of the piston for allowing misalignments of the ramp discs and the piston.

US 2016/0032994 A1 discloses a brake device, wherein a brake piston can conventionally be biased by hydraulic pressure generated by the actuation of a brake paddle for producing a brake force. Additionally, it is possible to use the brake device as a parking brake. For generating a parking brake force an electric motor drives a nut via multiple meshing gears and a planetary gear set. The rotation of the nut leads to an axial movement of the spindle meshing with the nut. A pressure plate supported by a ramp transmission system at the spindle moves towards a bottom of the piston and abuts the same. Further rotation of the nut leads to a movement of the piston with the brake pad towards the brake disc. When exceeding a threshold of the brake force, a spring-biased clutch is automatically opened for allowing a rotational movement of the spindle together with the nut. In the ramp transmission system an intermediate ramp disc clamped on both sides under interposition of rolling balls to the pressure plate and the housing is linked to the spindle by another threaded connection. A relative movement of the ramp discs of the ramp transmission system leads to an increase of the brake stroke during a second brake stroke part.

According to DE 198 53 721 A1 a spindle of a threaded transmission system is fixedly connected to a piston with associated brake pad. Accordingly, here the spindle is fixed against rotation. The spindle meshes with a nut. The nut is coupled via a ramp transmission system to the rotor of an electric drive. Another embodiment of DE 198 53 721 A1 discloses a brake device, wherein in one operational mode by a mechanical drive mechanism as described before the brake can be actuated via an electric motor by use of a spindle drive and a ramp transmission system, whereas in a differing operational mode the brake piston is directly biased by hydraulic pressure.

DE 10 2006 033 333 A1 discloses a brake device wherein a service brake force is generated by hydraulically biasing a brake piston. An electric parking brake is integrated into the brake device. Here, the electric motor drives the brake piston via a ramp transmission system and a threaded transmission system.

WO 2014/106672 A1 corresponding to U.S. Ser. No. 10/066,692 B2 relates to the general design of a brake device actuated in a conventional way via a rotating brake lever transferring an actuating force originating from a hydraulic, pneumatic or electro-mechanical actuator.

SUMMARY OF THE INVENTION

The invention proposes a disc brake actuator for a vehicle which comprises an electrical drive instead of a conventional pneumatic brake chamber. The use of an electrical drive opens the way for an electronic control of the disc brake actuator with extended control options and the option to use electrical energy present at the vehicle.

Furthermore, according to the invention the disc brake actuator comprises a transmission unit which is driven by the electrical drive. According to the invention, the transmission unit comprises two different transmission systems, namely
 a ramp transmission system and
 a threaded transmission system.

These two transmission systems are both designed and configured for transforming a rotational driving movement to a translational driving movement which in the end serves for moving the brake pads and for providing the brake force. However, in the two transmission systems different types of mechanisms with different designs and characteristics can be used.

With the novel disc brake actuator for a vehicle it is possible to provide a disc brake actuator in particular with
 an alternative design,
 an improved force transfer,
 improved kinematics,
 improved performance,
 improved options for considering different parts of the brake stroke of a disc brake as the stroke part for closing a brake pad clearance, a stroke part with brake pads contacting the brake disc with small normal forces and/or a stroke part of the brake stroke wherein the brake pads contact the brake disc with a high normal force and the need to carefully control the normal force.

The invention proposes that the ramp transmission system and the threaded transmission system are arranged in series in the force flow of the transmission unit. This means in particular that in the transmission unit the force is not divided to the two transmission systems but the force biases both transmission systems. On the other hand, the translational movement at the output of the transmission unit (in particular the translational movement of the brake pad coupled to the disc brake actuator) equals the sum of the translational movements of the ramp transmission system and the threaded transmission system.

By the use of the two transmission systems it is possible to individually design the different transmission systems according to the needs. Here it is also possible that the different transmission systems are individually adapted to specific operating states of the disc brake actuator or the disc brake itself.

Generally, any order of the threaded transmission system and the ramp transmission system is possible. However, according to one embodiment, the threaded transmission system is arranged downstream from the ramp transmission system when seen in the force flow from the electrical drive through the transmission unit.

Generally, it is possible that in some or all operating states the two transmission systems are operated simultaneously. According to another proposal, in a brake stroke of the disc brake actuator the actuation of the electrical drive in a first brake stroke part actuates the threaded transmission system, whereas in a subsequent part of the brake stroke the ramp transmission system is actuated (whereas the formerly actuated threaded transmission system is deactivated and keeps its reached state). To mention only one non-limiting example, the first part of the brake stroke wherein the threaded transmission system is operated is or includes the brake stroke part for closing a clearance between the brake pads and the brake disc (and in some cases also the initial contact between the brake pad and the brake disc with small normal forces). For this example the ramp transmission system is then operated for higher contact forces between the brake pads and the brake disc. Accordingly, for this non-limiting example it is possible to specifically design the threaded transmission system for overcoming the clearance of the brake. Preferably, the threaded transmission system has a characteristic that the rotation of the electrical drive leads to a comparatively large translational movement for closing the brake clearance in a short time interval leading to an improvement of the brake performance. On the other hand it is possible to specifically design the ramp transmission system according to the needs for the control of the brake force for contacting brake pads.

It is also possible that in a return brake stroke of the disc brake actuator for releasing the brake the order is alternated so that the return actuation of the electrical drive first operates the ramp transmission system and then operates the threaded transmission system. By this measure it is provided that in any case the ramp transmission system is returned to its initial state which is also independent on any changes of the brake clearance due to wear.

Under the (theoretical) assumption that for an actuation of the disc brake actuator the resistance of the threaded transmission system against a relative rotation of the transmission components equals the resistance of the ramp transmission system against a relative rotation of the transmission components, the two transmission systems would be operated at the same time for the same driving torque. In order to guarantee that the threaded transmission system is operated before the ramp transmission system, according to one proposal of the invention the resistance in the ramp transmission system is increased by a spring which biases the ramp transmission system. To mention only some non-limiting examples, the spring might increase the normal force pressing a roller of the ramp transmission system against the ramp. In the case of the use of a spring increasing the normal force at the ramps, the threads in the threaded transmission system are biased by a normal force which correlates or equals the normal brake force at the thrust plate. Instead, the normal force in the ramp transmission system includes a normal force component equalling or corresponding to the normal brake force at the thrust plate as well as an additional normal force component resulting from the bias by the spring. For a variant of the invention, the spring might be a torsional spring biasing the rollers or a cage of the rollers towards the starting point of the ramps. The spring biasing the ramp transmission system is preferably a pre-tensioned spring. By a choice of the spring stiffness and the pre-tension of the spring, it is possible to adjust the switching point from the operation of the threaded transmission system to operation of the ramp transmission system.

There are a lot of options for providing the switching from the operation of the threaded transmission system to the operation of the ramp transmission system (and/or vice versa). For one embodiment, the switching from the operation of the threaded transmission system to the operation of the ramp transmission system is automatically triggered. This triggering function is provided by the friction in the threaded transmission system, the friction in the ramp transmission system, by a ramp inclination in the ramp transmission system and/or a force of a spring biasing the ramp transmission system towards a starting point of the ramps.

Within the frame of the invention it is possible to use any known ramp transmission system. For one embodiment, the ramp transmission system comprises a rotating driving element. The rotating driving element has a fixed axial position. The rotating driving element is (directly or indirectly) driven by the electrical drive. Furthermore, the ramp transmission system comprises a driven element. The driven element is both movable in axial direction as well rotatable. Between the driven element and the driving element at least one rolling element is clamped such that the rolling element establishes a normal force both with the driving element as well as with driven element. The rolling element rolls along the contact surfaces provided by the driving element and the driven element. The movement of the rolling element along the contact surfaces is caused by the friction in the contact areas between the rolling element and the driving element and the driven element. At least one of the contact surfaces forms a ramp.

The function of a ramp transmission system of this type can be explained on the basis of the following non-limiting example: If the threaded transmission system is operated, the ramp transmission system forms a block wherein there is no rolling movement of the rolling element. In this operational state the rotation of the driving element causes a rotation also of the driven element with the same rotational velocity. The rotation of the driven element is transferred to the threaded transmission system leading to the operation of the threaded transmission system. Instead, if in another operational state there is a rolling movement of the rolling element, the ramp leads to a relative movement between the driving element and the driven element in the heights direction of the ramp so that the ramp transmission system is operated. Due to the rolling movement of the rolling element, it is possible that the driven element does not change its rotational orientation. Accordingly, for the operated ramp transmission system the threaded transmission system is not operated.

Generally, it is possible that only one of the contact surfaces of the driving element and the driven element with the rolling element comprises a ramp. However, the design options are extended with a disc brake actuator wherein both the contact surface of the driving element as well as the contact surface of the driven element each form a ramp.

Generally, the (at least one) ramp might have any contour. In the simplest case the ramp has a constant inclination leading to a straight contour in circumferential direction. However, the contour might have the shape of any curve with continuous changes of the inclination or also kinks of the contour with a sudden change of the inclination. For one proposal, the ramp has portions of different inclinations. By the choice of the different inclinations it is in particular possible to adapt the characteristic of the ramp transmission system to different parts in the brake stroke and brake forces of different amounts. It is e.g. possible to use portions of the ramp with smaller inclinations in operating states of the brake disc where a very sensitive control of the brake force is required.

Generally, the contact surface forming the ramp might be formed by any part integrated into the force flow from the electrical drive. For a very compact and stiff design the invention proposes that the driving element of the ramp transmission system is a gearwheel. In this case the contact surface which forms the ramp is formed by a front face of the gearwheel.

Generally, it is possible that a ball is used as the rolling element. However, the contact area between a rolling element and the contact surface or ramp is comparatively small. For the use of larger contact areas the invention proposes to use a roller or also a double-roller as the rolling element. This leads to decreased surface tensions and an increased lifetime and in some cases also to improved friction characteristics at the rollers.

For another proposal the roller or double-roller (or a plurality of rollers or double-rollers) is/are accommodated in a cage element which is useful for the assembly process and for keeping the rolling elements in their desired positions and orientations throughout the lifetime of the disc brake actuator.

Generally, it is possible that further transmission units or other components are arranged between the driven element of the ramp transmission system and a threaded driving element of the threaded transmission system. However, for one embodiment the driven element of the ramp transmission system is fixedly connected to a threaded driving element of the threaded transmission system. In other words, the driven element of the ramp transmission system directly drives the driving element of the threaded transmission system building a very compact design and a very stiff coupling between the ramp transmission system and the threaded transmission system.

According to another proposal, the driven element of the ramp transmission system and the threaded driving element of the threaded transmission system are integrally formed by a sleeve. In this case it is possible that the contact surface of the driven element of the ramp transmission system is formed by a ring-shaped radial shoulder of the sleeve. A thread of the threaded driving element can be formed by an outer or inner surface of the sleeve (which then cooperates with a thread of an inner or outer surface of the driven element of the threaded transmission system).

The operating state of the disc brake actuator can be sensed in any way. It is e.g. possible that any translational and/or rotational movement of a component of the disc brake actuator is sensed which correlates with the position of a thrust plate of the disc brake actuator and so the position of the brake pad. To mention only some other non-limiting examples, the operational state of the disc brake actuator might be derived from the electrical state and energization of the electrical drive. Furthermore, it is possible that the force at any part in the force flow from the electrical drive to the thrust plate of the disc brake actuator is sensed by a force sensor. For a preferred embodiment of the invention, the axial supporting force of the ramp transmission system in axial direction is sensed by an axial force sensor. The sensed force correlates to the brake force produced by the disc brake actuator. For the integration of the force sensor in the force flow there are various options. For one exemplary embodiment the rotating driving element of the ramp transmission system is supported by a supporting element at least in one axial direction. The axial supporting force in the supporting element in the afore mentioned axial direction is sensed by the axial force sensor.

There are a lot of options for the design of the threaded transmission system. For one particular disc brake actuator it is proposed that the threaded transmission system comprises a rotatable threaded driving element (which can indirectly or directly be driven by the driven element of the ramp transmission system). Furthermore, the threaded transmission system comprises a threaded driven element. The threaded driven element is fixed against rotation but comprises an axial degree of freedom. The threaded driving element and the threaded driven element are threaded with each other. The threading angle between the threaded driving element and the threaded driven element changes with a rotation of the threaded driving element. Accordingly, the rotation of the threaded driving element caused by the electrical drive (preferably under interposition of the ramp transmission system) is transformed by the threaded transmission system to a translational movement. Here, the transfer characteristic between the threaded driving element and the threaded driven element depends on the inclination of the threads of the threaded driving element and the threaded driven element.

The invention also proposes that the threaded driving element of the threaded transmission system is biased by a torsional spring. The torsional spring serves for changing or returning the threading angle at least partially to the initial state in a return brake stroke for releasing the brake with termination of an energization of the electrical drive or with an actuation of the electrical drive in return direction.

In the disc brake actuator two different clutch mechanisms or switching mechanisms can be used:

It is possible that the application of the torque of the torsional spring is controlled by a sliding clutch member. The sliding clutch member serves for limiting the torque applied by the torsional spring to a threshold which is defined by the sliding clutch.

For an alternative or cumulative embodiment the application of the torque of the torsional spring is controlled by a uni-directional clutch mechanism. Preferably, the uni-directional clutch mechanism deactivates the torsional spring during the brake stroke when applying the brake so that the torsional spring does not influence the force conditions at the threaded transmission system and the ramp transmission system during the brake stroke. Instead, when releasing the brake in the return brake stroke the uni-directional clutch activates the torsional spring so that the torque of the torsional spring is applied to the threaded transmission system and the ramp transmission system.

There are a lot of options for driving the transmission unit, in particular the driving element of the ramp transmission system. It is possible that the transmission unit is directly driven by an output shaft of the electrical drive. However, according to one proposal the transmission unit is driven by the electrical drive via a further transmission unit of any known design. For one particular embodiment the further transmission unit comprises a planetary gear set, wherein the transmission unit or the driving element of the ramp transmission system might be (directly or indirectly) coupled to any component of the planetary gear set. However, for one particular proposal of the invention a planet carrier of the planetary gear set is fixed against rotation to a gearwheel. The gearwheel meshes with the gearwheel of the transmission unit. A sun gear of the planetary gear set is (directly or indirectly) driven by the output shaft of the electrical drive.

Generally, it is possible that the brake pad position and/or the brake force is solely controlled by the electronic control of the electrical drive. However, this might mean that for providing a brake force being constant over a certain time interval it is required that the electrical energization of the electrical drive has to be upheld throughout this time interval. For another proposal a fixing unit is provided in the disc brake actuator. The fixing unit serves for fixing an operational state of the disc brake actuator independent on the energization of the electrical drive. Here, the fixing unit might fix in any way any component of the disc brake actuator, in particular a component of the planetary gear set, of the further transmission unit, of the ramp transmission system and/or the threaded transmission system which in the end leads to a fixation of the brake pad in its applied position and/or with the applied brake force. The fixing unit might be based upon a latching or locking interaction between a first fixing element fixed to the housing and a second fixing element fixed to the afore mentioned component. However, it is also possible that the fixing unit provides an electromagnetic fixing force or a frictional fixing force by controlling the normal force between the afore mentioned fixing elements.

It is also possible that a sensor is integrated into the disc brake actuator which senses the wear of the brake pads. However, the sensor does not "directly" sense the wear at the brake pads. Instead, the sensor senses the operation of the threaded transmission system. This embodiment bases on the finding that after the application and the subsequent release of the brake the threaded transmission system remains in an operating position (i.e. at a threading angle) which changes with increasing wear of the brake pads. Accordingly, by sensing the threading angle it is possible to indirectly measure the wear of the brake pads.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a roller is mentioned, this is to be understood such that there is exactly one roller or there are two rollers or more rollers. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Figure 1:
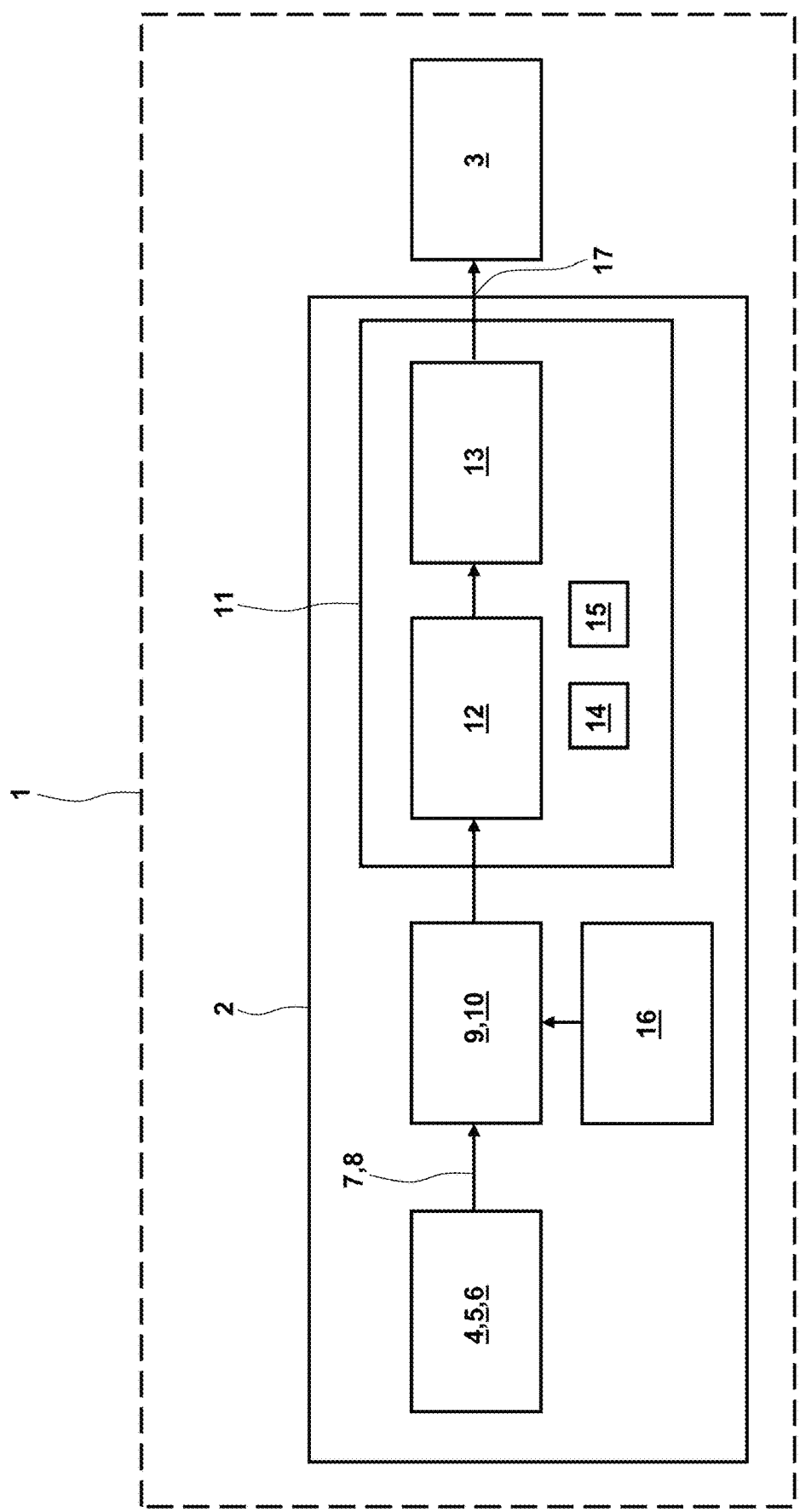
FIG. 1 schematically shows a disc brake actuator and its interaction with a brake pad.

FIG. 1 schematically shows a disc brake assembly 1. In the disk brake assembly 1 a disc brake actuator 2 is coupled to a brake pad 3 for moving the brake pad 3 towards a brake disc (not shown) and for applying a brake force upon the brake pad 3. It is possible that the disc brake actuator 2 is coupled by any transmission system to the brake pad 3. Preferably, the disc brake actuator 2 comprises a thrust plate 17 mounted to the brake pad 3. The disc brake actuator 2 comprises an electrical drive 4. The electrical drive 4 comprises a rotor 5 and a stator 6. An electrical energization of the electrical drive 4 controlled by an electronic control unit (not shown) leads to a rotation of the rotor 5 and to the provision of a driving torque 7 transferred by an output shaft 8 of the electrical drive 4 to a further transmission unit 9. The further transmission unit 9 serves for a change of the torque 7 and the rotational velocity by a suitable transmission ratio. The further transmission unit 9 preferably comprises a planetary gear set 10. The further transmission unit 9 drives a transmission unit 11. The transmission unit 11 comprises a ramp transmission system 12 and a threaded transmission system 13 arranged in series in the force flow as shown in FIG. 1. The transmission unit 11 serves for changing a rotational movement of an output shaft of the further transmission unit 9 to a translational movement of the output element of the transmission unit 11 with two different transmission ratios, namely one transmission ratio defined by the ramp transmission system 12 and another transmission ratio defined by the threaded transmission system 13. The output element, in particular a thrust plate 17, of the threaded transmission system 13 or the transmission system 11 drives the brake pad. It is possible that a sensor 14 for sensing the brake force and/or a sensor 15 for sensing a threading angle of the threaded transmission system 13 for indirectly sensing the wear of the brake pad 3 is/are integrated into the transmission unit 11. Furthermore, the disc brake actuator 2 optionally might comprise a fixing unit 16 which serves for fixing the operational position of a component of the further transmission unit 9 or of the output shaft 8.

Figure 2:
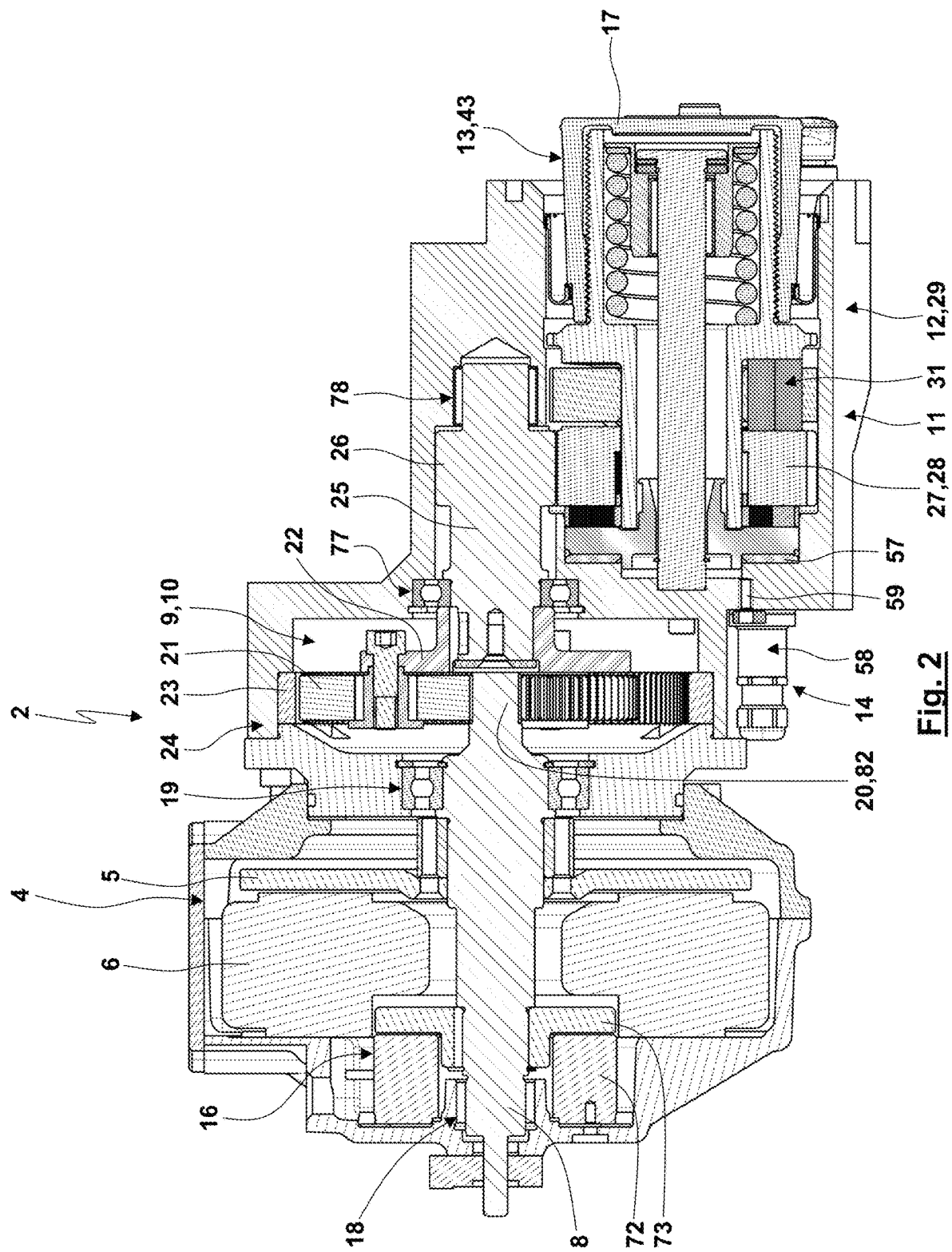
FIG. 2 shows a longitudinal section through a disc brake actuator with an electrical drive, a fixing unit, a planetary gear set and a transmission unit with a ramp transmission system and a threaded transmission system.

FIG. 2 shows a longitudinal section through a disc brake actuator 2 with a thrust plate 17 for coupling the disc brake actuator 2 to a brake pad. Here, the electrical drive 4 is formed by a ring-shaped rotor 5 and a ring-shaped stator 6 with a small axial gap there between. The ring-shaped rotor 5 is fixed to the output shaft 8 of the electrical drive 4. On both sides of the electrical drive 4 the output shaft 8 is supported by bearings 18, 19. A free end region 82 protruding from the bearing 19 forms a sun gear 20 of the planetary gear set 10. Planet gears 21 mesh with the sun gear 20. The planet gears 21 are rotatably supported by a planet carrier 22. On the radial outer side the planet gears 21 mesh with an internal gearwheel 23 fixed to the housing 24. The planet carrier 22 drives a shaft 25. For the shown embodiment, the planet carrier 22 is fixedly mounted to the shaft 25. The shaft 25 here integrally forms a gearwheel 26. The shaft 25 is supported by bearings 77, 78. The gearwheel 26 drives the transmission unit 11 by meshing with a driving element 27 of the transmission unit 11 here formed by a driving gearwheel 28.

Figure 3:
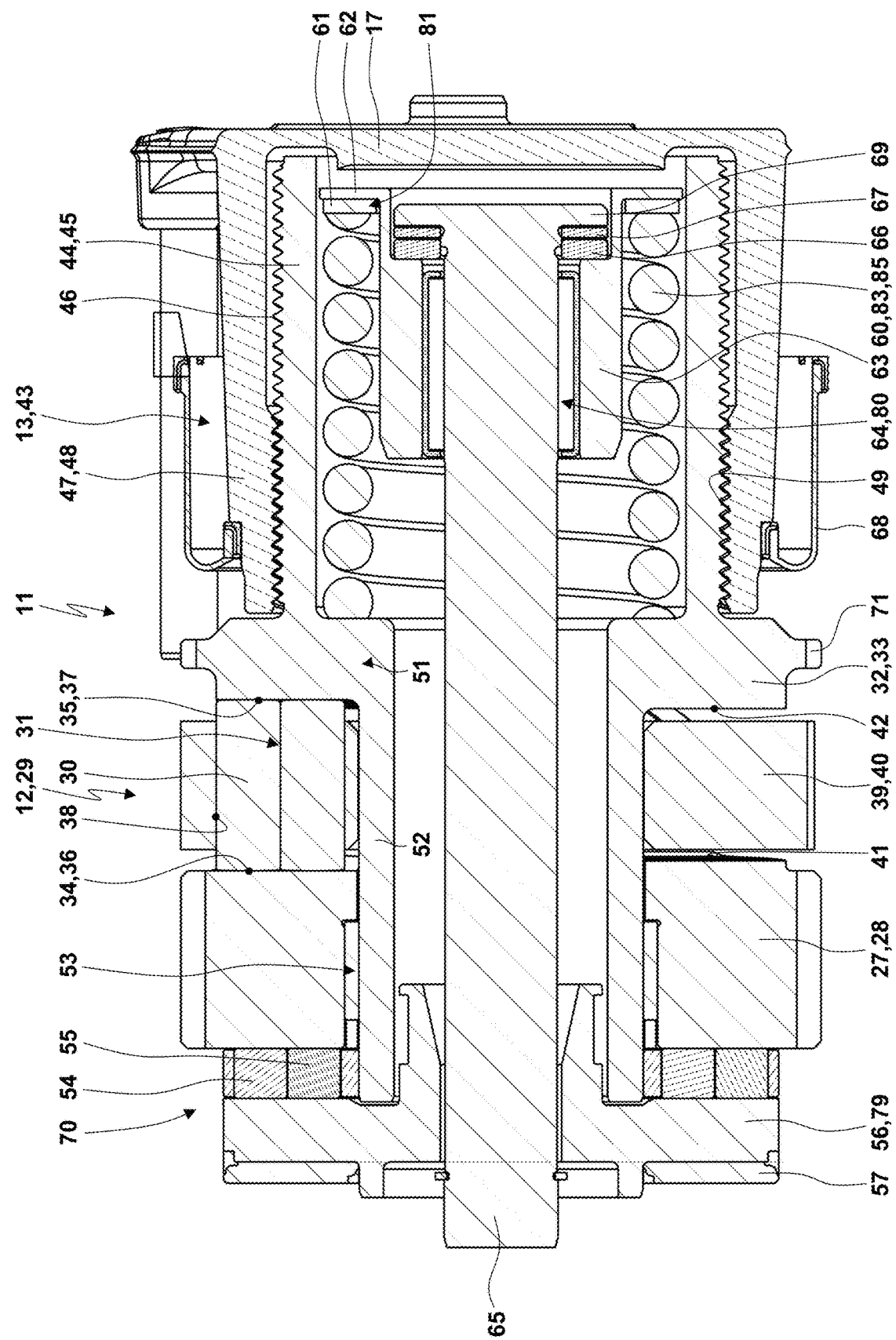
FIG. 3 shows a longitudinal section of the transmission system of the disc brake actuator of FIG. 2.

The driving gearwheel 28 is a component of a ramp transmission system 12, 29 (cp. FIG. 3). The ramp transmission system 29 is built with the driving gearwheel 28, rollers 30 or double-rollers 31 and a driven element 32, here formed by a ring disc portion 33. The front faces 34, 35 of the driving gearwheel 28 and the ring disc portion 33 facing towards each other form contact surfaces 36, 37. For a relative rotational movement between the driving gearwheel 28 and the ring disc portion 33, the rollers 30 or double-rollers 31 roll along the contact surfaces 36, 37. The driven element 32 is rotatably supported but displaceable in longitudinal direction. A pre-tensioned spring 83 biases the driven element with a normal force towards the rollers or double-rollers 31 and biases the rollers or double-rollers 31 with the normal force towards the driving gearwheel 28. The double-rollers 31 are accommodated in recesses 38 of a cage element 39, here a ring disc 40. For the shown embodiments three double-rollers 31 and the associated recesses 38 of the cage element 39 are evenly distributed in circumferential direction.

Figure 6:
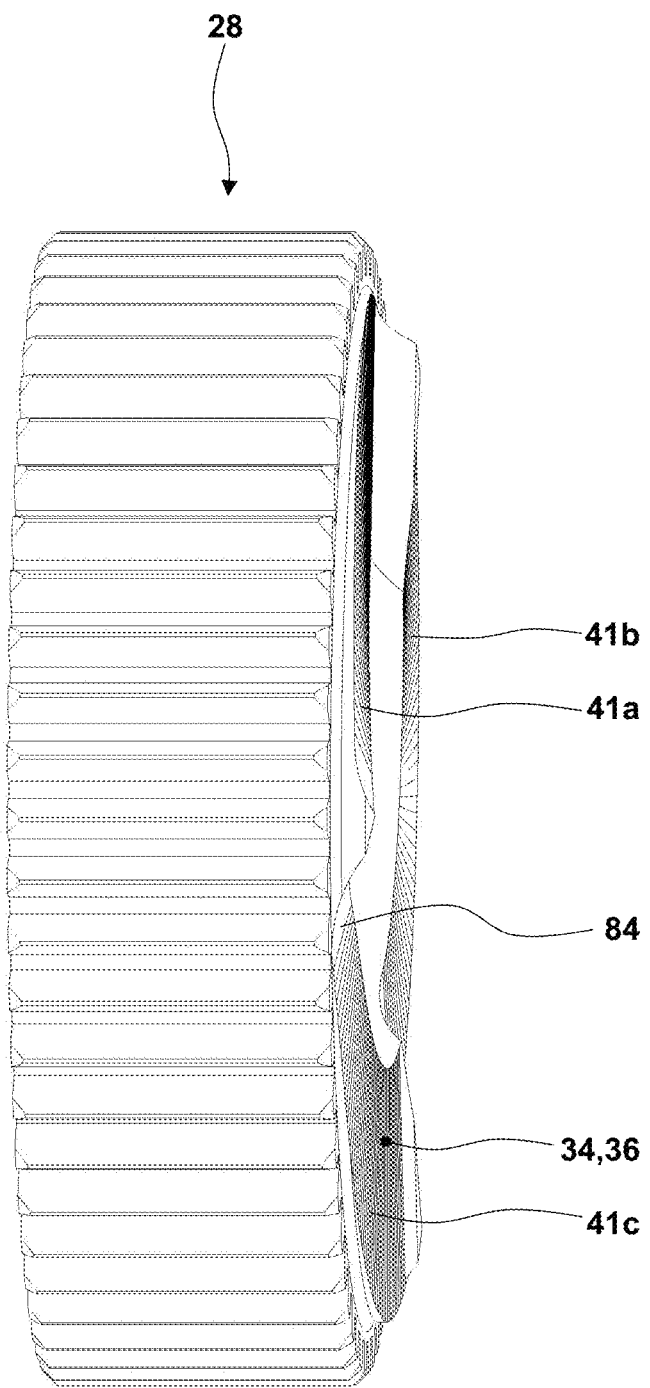
FIG. 6 is a three-dimensional view of a gearwheel of the transmission unit of FIGS. 3 and 4 comprising ramps.

FIG. 6 shows the gearwheel 28 in a three-dimensional view. The contact surface 36 forms three ramps 41a, 41b, 41c each cooperating with an associated double-roller 31a, 31b, 31c. As can in particular be seen from FIG. 4, also the contact surface 37 of the ring disc portion 33 forms ramps 42a, 42b, 42c. The ramps 41, 42 of the ring disc portion 33 and the gearwheel 28 preferably have the same contours. However, the contours are inverted such that in the same circumferential direction both ramps 41, 42 have an inclination such that the ramps 41, 42 both move towards the other ramp (or both move away from the other ramps). Without any driving torque applied to the gearwheel 28 (or with an applied torque below a threshold defined by spring 83) the double rollers 31 are at a starting point 84 of the ramps 41, 42 (see the position effective in FIG. 3). If the gearwheel 28 rotates but the ring disc portion 33 does not rotate, the rolling movement of the double rollers 31 along the contact surfaces 36, 37 with the ramps 41, 42 has the result that the axial distance of the gearwheel 28 from the ring disc portion 23 changes according to the pitches of the ramps 41, 42. In this way the ramp transmission system 29 transforms a rotational movement of the gearwheel 28 into an axial movement of the ring disc portion 33.

Furthermore, the transmission unit 11 comprises a threaded transmission system 13, 43. The threaded transmission system 43 comprises a threaded driving element 44, here formed by a sleeve portion 45 having an outer thread 46. Furthermore, the threaded transmission system 43 comprises a threaded driven element 47, here a sleeve portion 48 comprising an inner thread 49. The threaded driven element 47 is in a first approximation in the shown longitudinal section of FIG. 3 U-shaped, wherein the two vertical legs of the U form the sleeve portion 48 and the horizontal leg of the U forms the thrust plate 17. The threaded driven element 47 is fixed against rotation, e.g. by guiding rods 50 shown in FIG. 4 and being guided in corresponding bores of a housing (not shown). It is also possible to have a connection between the thrust plate and the back plate of the brake pad for preventing rotation, as is e.g. used in the ModulT brake, sold by HALDEX, and which technology is shown in EP 1 832 777 B1 of the applicant. It is also possible to arrange a rotationally rigid bellow 68 surrounding the thrust plate 17, for preventing rotation thereof in relation to the housing 24. When rotating the threaded driving element 44, the threading angle (which means the rotational angle between the threaded driving element 44 and the threaded driven element 47) between the threaded driving element 44 and the threaded driven element 47 changes. The change of the threading angle leads to a translational movement of the threaded driven element 47.

The threading of the thrust plate 47 and the sleeve portion 45 is in particular as follows: The thread has an outer diameter of 64 mm, a pitch of 14 mm, and it has 7 thread starts. This means that any relative rotation between the two threaded parts leads to large translational movement. When the rotation in the threaded elements stop, due to too high friction, the fast portion of the ramp starts. The rotation of the ramp leads to less translational movement than the thread, and hence to a reduced gear ratio. However, dependent on the inclination of the ramps it is possible that at the start of the rolling movement of the rollers along the ramps

- the gear ratio of the ramp transmission system is the same as the gear ratio of the threaded transmission system and the gear ration then increases with the continued rolling movement along the ramps or
- the gear ratio of the ramp transmission system is larger than the gear ratio of the threaded transmission system and the gear ration then remains constant or further increases with the continued rolling movement along the ramps.

In the transmission unit 11 the driven element 32, here the ring disc portion 33, of the ramp transmission system 29 is in driving connection with the threaded driving element 44 of the threaded transmission system 43. For the shown embodiment, the ring disc portion 33 and the sleeve portion 45 are integrally formed by a stepped sleeve 51, wherein the ring disc portion 33 is formed by a radial collar of the sleeve 51. On the side of the ring disc portion 33 facing away from the sleeve portion 45 the sleeve 51 forms another sleeve portion 52 having diameters being smaller than those of the sleeve portion 45. The outer surface of the sleeve portion 52 serves for supporting and bearing both the cage element 39 and the driving gearwheel 28. For the shown embodiment, a radial needle bearing 53 is used for supporting the driving gearwheel 28 at the sleeve portion 52.

On the side facing away from the double-rollers 31 the driving gearwheel 28 is axially supported by axial needle bearings 54, 55 at a supporting disc or piston 56 which forms a supporting element 79. Together with a cage member the axial needle bearings 54, 55 form an axial bearing unit 70.

The supporting disc 56 is supported in axial direction by a silicone sensor pad 57 supported at the housing 24 and communicating with an external pressure sensor unit 58 through a bore 59 of the housing 24. The silicone sensor pad 57 and the pressure sensor unit 58 together build the sensor 14 for sensing the normal force or brake force.

A torsional spring 60 extends within the sleeve portion 45. For the shown embodiment the torsional spring 60 and the spring 83 are formed by one single integral and multifunctional spring 85. One spring base of the torsional spring 60 bears against the sleeve 51, here a shoulder formed by the ring disc portion 33. The other spring base of the torsional spring 60 is supported via a sliding thrust washer 61 at a collar 62 of a sleeve 63. The sleeve 63 is supported in radial direction by a one-way needle roller bearing 64 at a supporting rod 65. The supporting rod 65 extends through the transmission unit 11 and is fixed in one end region at the housing 24. In axial direction the sleeve 63 is supported with a shoulder by an axial needle bearing 66 (or also a different type of bearing as e.g. an axial ball bearing) and a washer 67 at a radial collar 69 of the supporting rod 65. A sealing 68 is arranged between the threaded driven element 47 and the housing 24.

For the shown embodiment, the sleeve 51 comprises a gearwheel 71. The gearwheel 71 drives a gear of a sensor 15 for indirectly measuring the wear of the brake pad.

As an option the disc brake actuator 2 comprises a fixing unit 16 with a first fixing element 72 and a second fixing element 73 (cp. FIG. 2). The first fixing element 72 is attached to the housing 24, whereas the second fixing element 73 is fixedly mounted to the output shaft 8 of the electrical drive 4. Upon actuation of the fixing unit 16 it is possible to fix the rotational position of the output shaft 8 and so also of the other parts of the disc brake actuator 2. The fixing unit 16 might be any locking brake or frictional brake. It is possible that the fixing unit 16 is controlled by the control unit of the electrical drive 4. Preferably, the fixing unit 16 is activated and/or deactivated by an electromagnetic actuator. It is also possible that the fixing unit is activated by a spring, wherein the fixing unit is deactivated by counteracting the force of the spring by an energization of the electromagnetic actuator.

Figure 7:
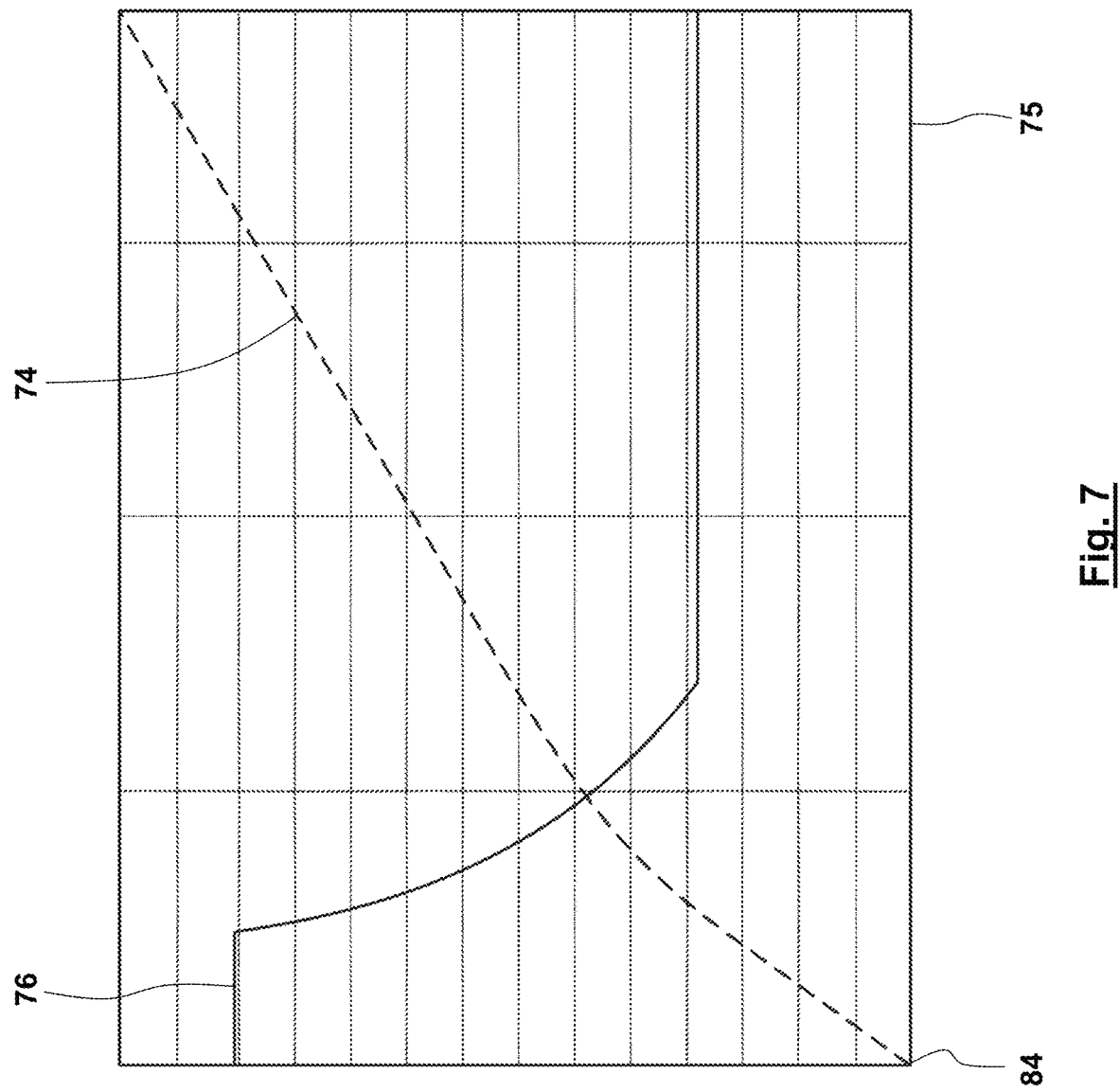
FIG. 7 shows a graph of a ramp contour and a ramp inclination.

FIG. 7 shows with the curve 74 with broken lines the contour of at least one of the ramps 41, 42 in circumferential extension 75. The curve 76 with the solid line shows the inclination of the ramps 41, 42 along the circumferential extension 75 of the same. In a first portion the ramps 41, 42 start with a constant large inclination, then in a second portion continuously decrease to a smaller inclination and then comprise a constant small inclination in the third portion. Accordingly, the curve 74 for the profile increases rapidly in its height in the first portion, whereas in the third portion the height increases more slowly.

The switching mechanism between an actuation of the threaded transmission system 43 and the ramp transmission system 29 will be explained on the basis of the following simplified and non-limiting example:

The torque $M_{thread}$ at the threaded transmission system 43 between the threads 46, 49 (which builds a resistance against a relative rotation of the driving element 44 and the driven element 47, and so a resistance against an operation of the threaded transmission system 43) is $$M_{thread} = F_{N,thrust\ plate} \mu R_{thread},$$

wherein $F_{N,\ thrust\ plate}$ is the normal brake force at the thrust plate, $\mu$ describes the coefficient of friction in the thread and $R_{thread}$ is the radius of the threads 46, 49. Here, μ already includes the dependency of the friction force on the given pitch of the thread. (For a different formulation of $M_{thread}$ wherein the coefficient μ represents the classical coefficient of friction the torque $M_{thread}$ also depends on the pitch of the thread.)

Instead, the torque $M_{ramp}$ resisting an operation of the ramp transmission system 29 is as follows:

$$M_{ramp} = F_{N,ramps} \sin \alpha R_{roller},$$

wherein α is the inclination of the ramps 41, 42 at the contact point of the rollers 30, $F_{N, ramps}$ describes the normal force between the rollers 30 and the ramps 41, 42 and $R_{roller}$ describes the radial distance of the contact point of the rollers 30 with the ramps 41, 42. Due to the additional bias of the driven element 32 by the spring 60, 83, the normal force $F_{N, ramps}$ equals the sum of the normal force at the thrust plate $F_{N, thrust\ plate}$ and the force of the spring 60, 83 $F_S$:

$$F_{N,ramps} = F_{N,thrust\ plate} + F_S.$$

At the start of the brake stroke with a zero force $F_{N, thrust\ plate}$, there is only a small driving torque required for operating the threaded transmission system 43 whereas due to the action of the spring 60, 83, there is a larger driving torque required for operating the ramp transmission system 29. Accordingly, at the beginning of the brake stroke, only the threaded transmission system 43 is operated whereas the ramp transmission system rotates as a rigid block. The switching point from the operation of the threaded transmission system 43 to the operation of the ramp transmission system is given when $M_{thread}$ equals $M_{ramp}$:

$$F_{N,thrust\ plate} \mu R_{thread} = F_{N,ramps} \sin \alpha R_{roller}.$$

From this equation the normal force at the thrust plate $F_{N, thrust\ plate}$ at the switching point from the threaded transmission system to the ramp transmission system results as follows:

$$F_{N,thrust\ plate} = F_S \sin \alpha R_{roller} / (\mu R_{thread} - \sin \alpha R_{roller}).$$

From the above equation it can be seen that the minimum normal brake force for which the ramp driving system will be operated depends on the inclination a and the force of the spring 60, 83 which again depends on the pretension of the spring 60, 83 in axial direction and the spring stiffness in axial direction. Furthermore, the switching point depends on constructive measures as $R_{roller}$, $R_{thread}$ and the coefficient of friction.

The function of the disc brake actuator 2 is as follows:

a) For released brake and existing brake clearance the control unit energizes the electrical drive 4 which leads to a rotation of the output shaft 8. The rotation of the output shaft 8 is then transmitted by the further transmission unit 9, here the planetary gear set 10, to the shaft 25 with the gearwheel 26 which again drives the driving gearwheel 28. Without any contact of the brake pad with the brake disc (or also for small contact forces), so below the above specified switching point, there is no rolling movement of the double-rollers 31. Instead, the driving gearwheel 28 and the sleeve 51 rotate as one block. Accordingly, the ramp transmission system 29 is not operated. However, the rotation of the sleeve 51 leads to an operation of the threaded transmission system 43 with a change of the axial position of the threaded driven element 47 leading to a closure of the brake clearance (and the application of a brake force below a given threshold).

During the rotation of the sleeve 51 the rotational movement is transferred by the torsional spring 60 and the frictional contact with the washer 61 to the sleeve 63. The one-way roller needle bearing 64 allows a rotational movement relative to the supporting rod 65 in this rotational direction. Accordingly, the torsional spring 60 is not able to apply a relevant torque upon the sleeve 51.

This operation of disc brake actuator 2 with the operation of the threaded transmission system 43 is also referred to as "first brake stroke part".

b) If the brake clearance has been closed (or the brake force has exceeded a given threshold), the above specified switching point has been reached such that there is no longer a threading relative movement between the elements 44, 47. Instead, starting with the switching point for a further rotation of the electrical drive 4 the elements 44, 47 move together as a single block only in longitudinal direction without any rotation. Starting with the above specified switching point, instead the rotational movement of the driving gearwheel 28 is now transferred by the ramp transmission system 29 to an axial movement of the sleeve 51. Accordingly, for upcoming brake forces (or for forces above the threshold) the brake normal force will be generated in the ramp transmission system 29. Here the transformation characteristic is defined by the contour of the ramps 41, 42. If the ramp inclination decreases with increasing rotational angle of the gearwheel 28, the stroke transmission ratio of the ramp transmission system decreases and it is possible to very carefully control the application of the brake force.

This operation of disc brake actuator 2 with the operation of the ramp transmission system 29 is also referred to as "second brake stroke part" (with a first stroke part section wherein the rollers 30, 31 contact portions of the ramps 41, 42 with a large inclination for providing smaller brake forces and with a second stroke part section wherein the rollers 30, 31 contact portions of the ramps 41, 42 with a smaller inclination for providing larger brake forces).

c) If a desired brake application has been reached, it is possible to deactivate the electrical drive and to uphold the brake application by an application of the fixing unit 14.

This operation of disc brake actuator 2 with the operation of the fixing unit 14 is also referred to as "constant brake application part"

d) For releasing the brake, the fixing unit 16 is released (if previously applied) and the electrical drive 4 is energized for the opposite return driving direction. During the return brake stroke for releasing the brake the rotation of the gearwheel 28 is at first transferred to a translational movement by the ramp transmission system 29, whereas during this part of the return brake stroke the threaded transmission system 43 is not operated (so the threaded transmission system 43 forms one block being solely moved by a translational movement).

This operation of disc brake actuator 2 with the operation of the ramp transmission system 29 is also referred to as "first return brake stroke part".

e) If the ramp transmission system 29 has returned into its initial stage (which is defined by a stop at the beginning of the ramps), the switching point of the return brake stroke has been reached. The use of the uni-directional clutch mechanism 80 (here the one-way-needle bearing 64) ensures that the ramp transmission system 29 is fully returned to its original position before any relative rotation of the threaded transmission system 43 is allowed. With further return movement of the gearwheel 28 the ramp transmission system 29 forms a block without a relative movement between the elements 27, 32, whereas then the threaded transmission system 43 is operated by a return threading movement between the elements 44, 47.

During the return movement the one-way roller needle bearing 64 fixes the sleeve 63 to the supporting rod 65.

Accordingly, in this case the rotation of the sleeve 51 leads to a bias of the torsional spring 60 which is limited by the frictional force between the base of the torsional spring 60, the washer 61 and the collar 62. By the choice of the normal force and the friction material and the friction surfaces it is possible to define the threshold of the friction force and so of the torque applied by the torsional spring 60. For one embodiment the torsional spring 60 is able to slip relative to the sleeve 63 for torques exceeding 7.5 Nm±30% or 20% or 10%.

This operation of disc brake actuator 2 with the operation of the threaded transmission system 43 is also referred to as "second return brake stroke part". It is the second return brake stroke part that defines the nominal clearance between the brake pads and the brake disc.

The one-way roller needle bearing 64 builds one possible embodiment for a uni-directional clutch mechanism 80. The frictional contact between the base of the torsional spring 60, the washer 61 and the collar 62 forms a sliding clutch mechanism 81.

For the shown embodiment, the integral spring 85 is used both for providing the normal force in the ramp transmission system 29 as well as for providing a return torque in the threaded transmission system. However, it is also possible that separate springs are used for these two purposes. Furthermore, it is possible that the spring which influences the switching point and the start of the operation of the ramp transmission system 29 is not a normal force pressing the driving gearwheel 28 and the driven element 32 in axial direction towards each other. Instead, the spring might also be a torsional spring which biases the driven element 32 or the cage element 39 towards the starting position of the ramp transmission system 29 and in this way biases the rollers 30 towards the starting point 84.

Figure 8:
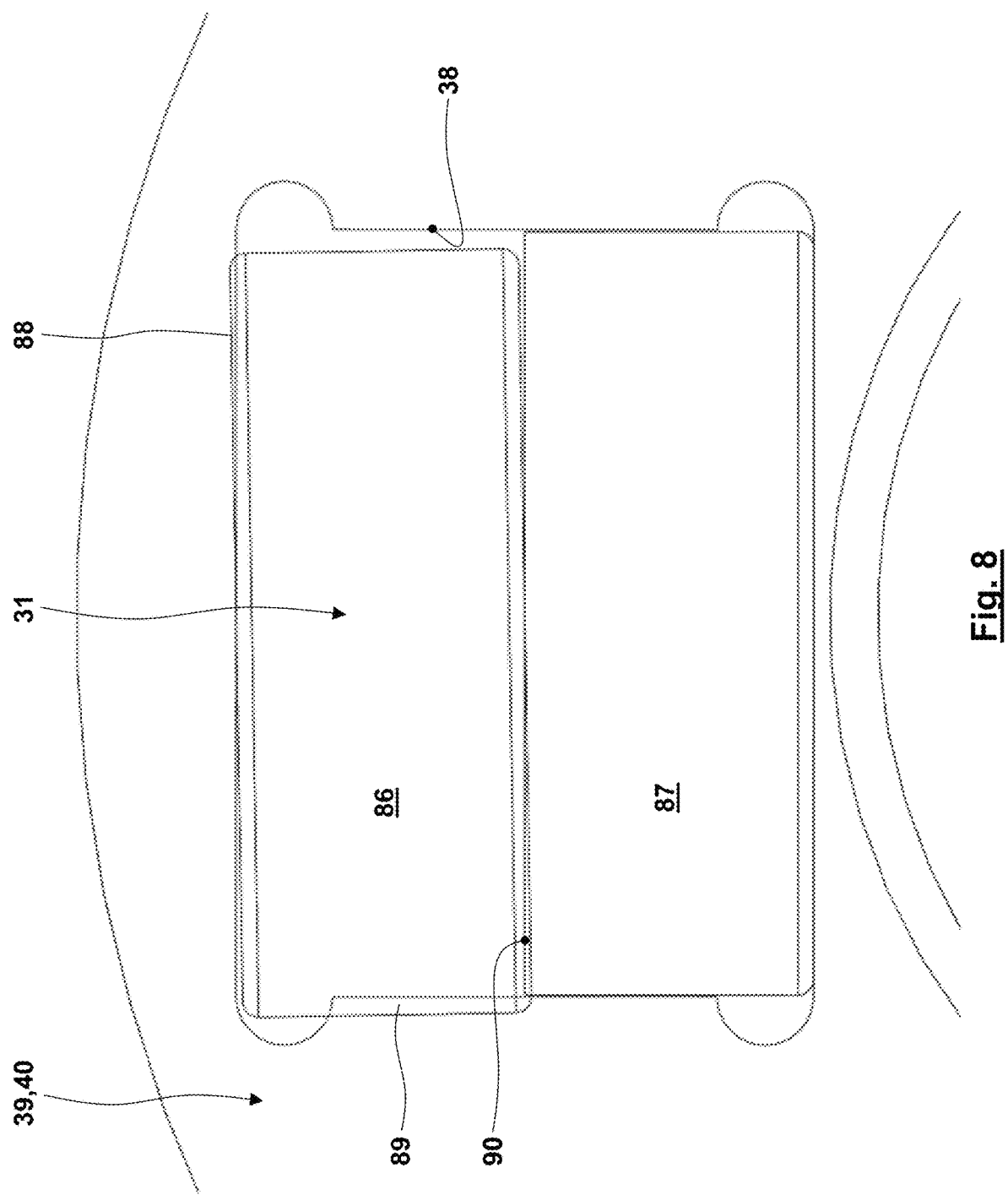
FIG. 8 shows an axial view of a detail of a pair of double-rollers in a ring disc.

FIG. 8 shows in an axial view double rollers 31 in a recess 38 of the ring disc 40. It is possible that the two rollers 86, 87 of the double-roller 31 are guided against each other and/or by the ring disc 40 by a suitable cage or guiding bolt allowing a rotation of the rollers 86, 87. However, it is also possible that the rollers 86, 87 are only housed within the recess 38 without any further guidance. During the rolling movement of the rollers 86, 87 along the ramps 41, 42 there might be a misalignment of the rollers 86, 87 which is shown in FIG. 8 (in a slightly exaggerated representation). The misalignment leads to the consequence that the rollers 86, 87 might collide with the limiting wall of the recess 38 (see positions 88, 89). It is also possible that the rollers 86, 87 located side-by-side collide with each other in particular at a position 90 located at the outer circumference of the front face of the rollers 86, 87. Misalignments of this type lead to an undesired increased friction and wear.

Figure 9:
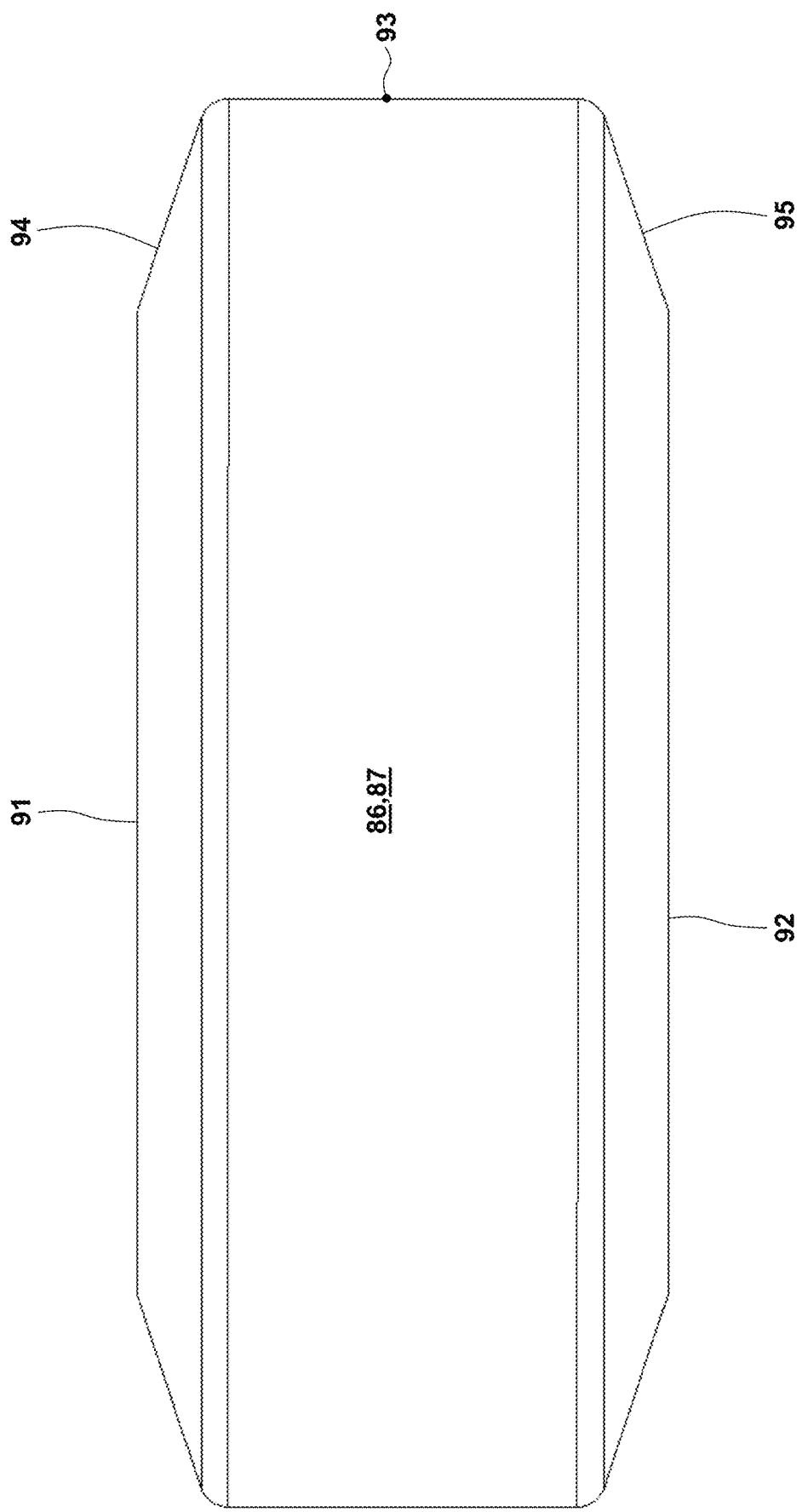
FIG. 9 shows a modified design of a roller.

FIG. 9 shows a modified design of the rollers 86, 87. The rollers 86, 87 have front surfaces 91, 92 having a curved or semi-spherical contour. The diameter of the front surfaces 91, 92 (horizontal extension in FIG. 9) is smaller than the diameter of the rolling surface 93 of the rollers 86, 87. The front surfaces 91, 92 transit via transition surfaces 94, 95 to the rolling surface 93. The transition surfaces 94, 95 are inclined and have in particular the shape of a truncated cone. The transition of the transition surfaces 94, 95 to the rolling surface 93 might be rounded as shown. The front surfaces 91, 92 might be flat or slightly curved, in particular with a diameter being more than the double, more than five times or more than ten times larger than the diameter of the rolling surface. The contour of the rolling surface 93 might be straight or also slightly curved or slightly semi-circular. Also the transition surfaces 94, 95 might have a straight or curved, in particular semi-circular contour.

Figure 10:
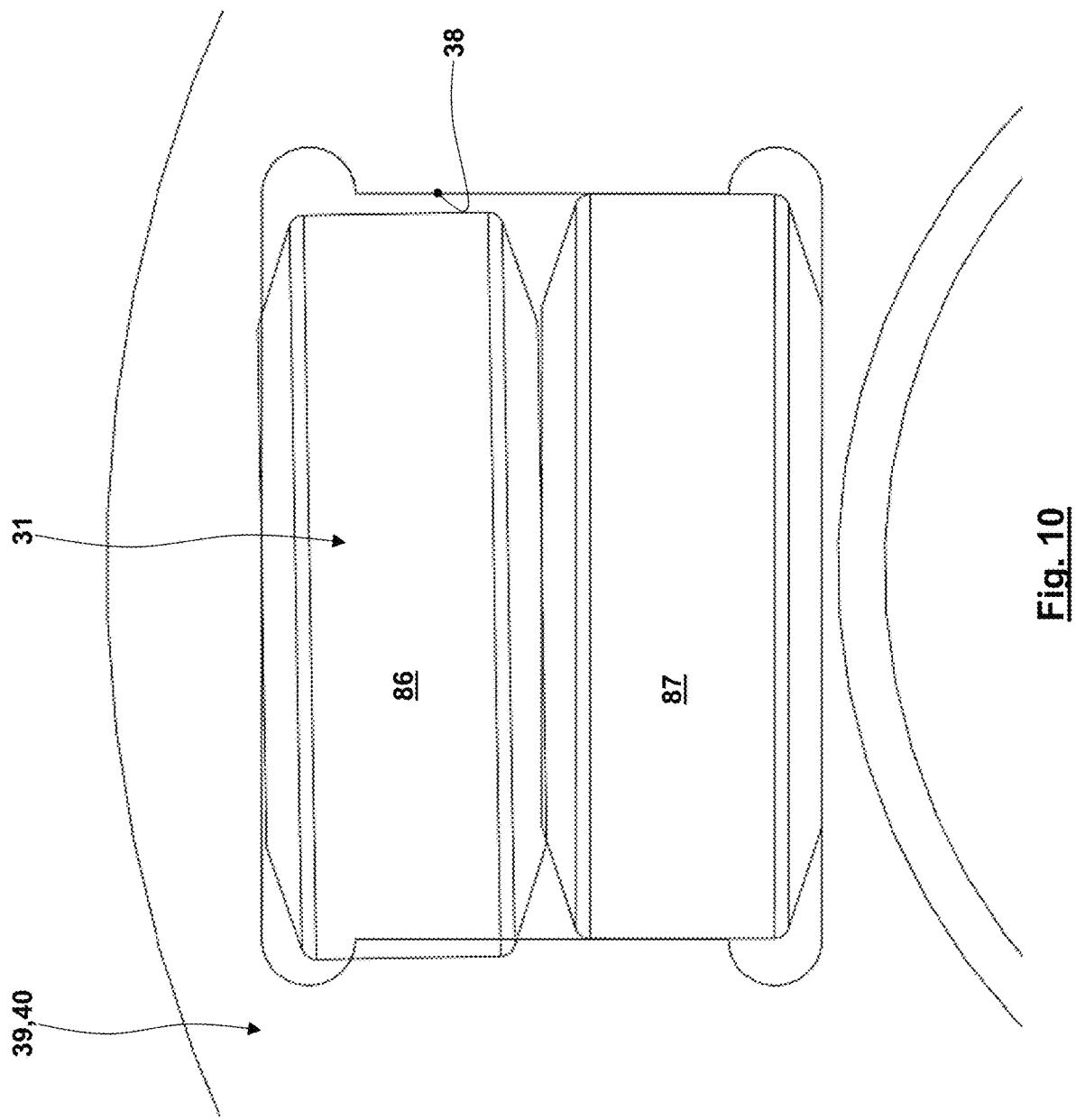
FIG. 10 shows an axial view of a detail with two modified rollers according to FIG. 9 in a ring disc.

FIG. 10 shows an axial view corresponding to FIG. 8, wherein here the rollers 86, 87 with the modified design are used. The rollers 86, 87 are able to tilt slightly without interfering with each other or with the limiting wall of the recess 38.

Figure 11:
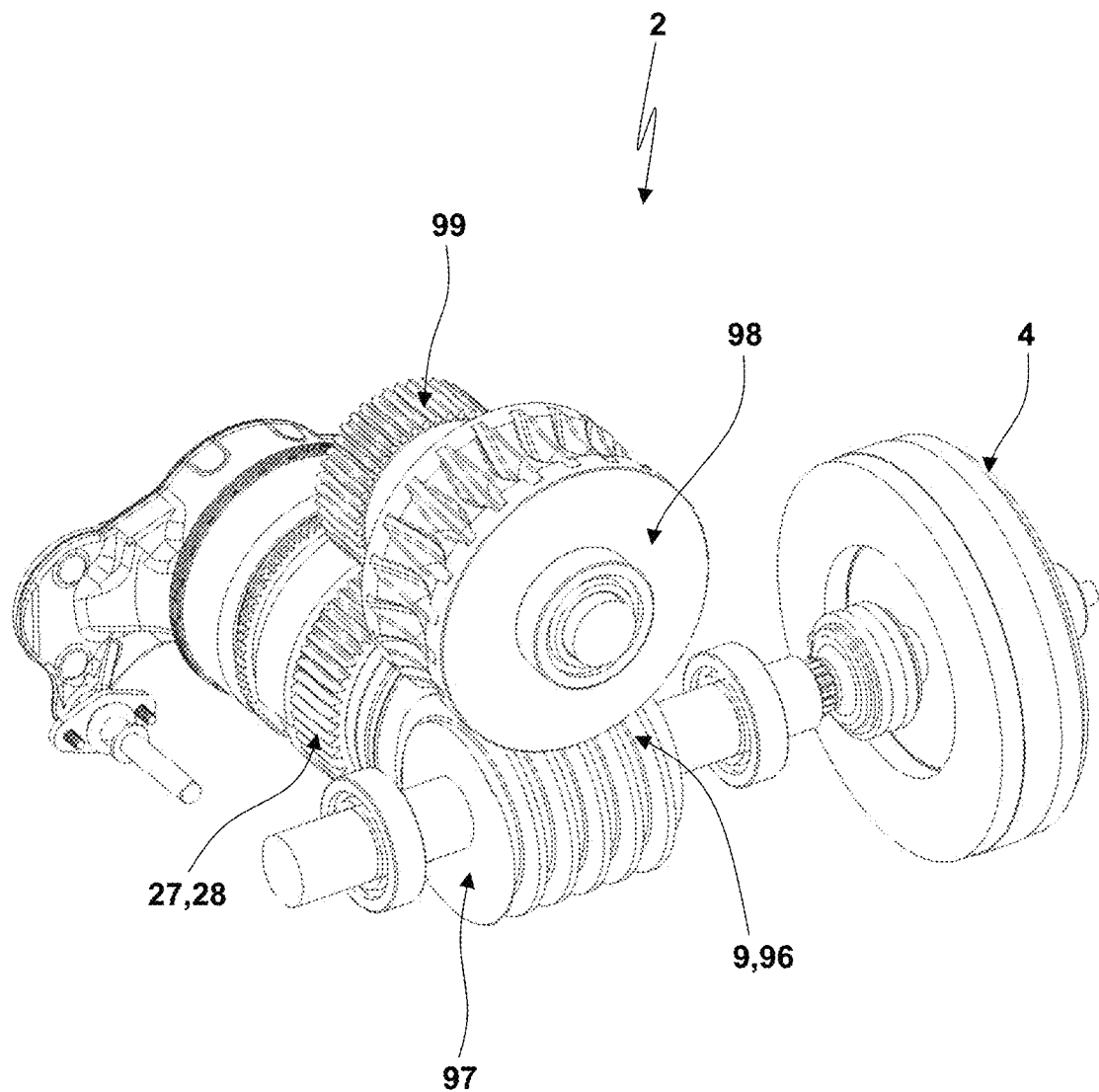
FIG. 11 in a three-dimensional view shows a disc brake actuator, wherein as a further transmission unit a worm transmission unit is used.
Figure 12:
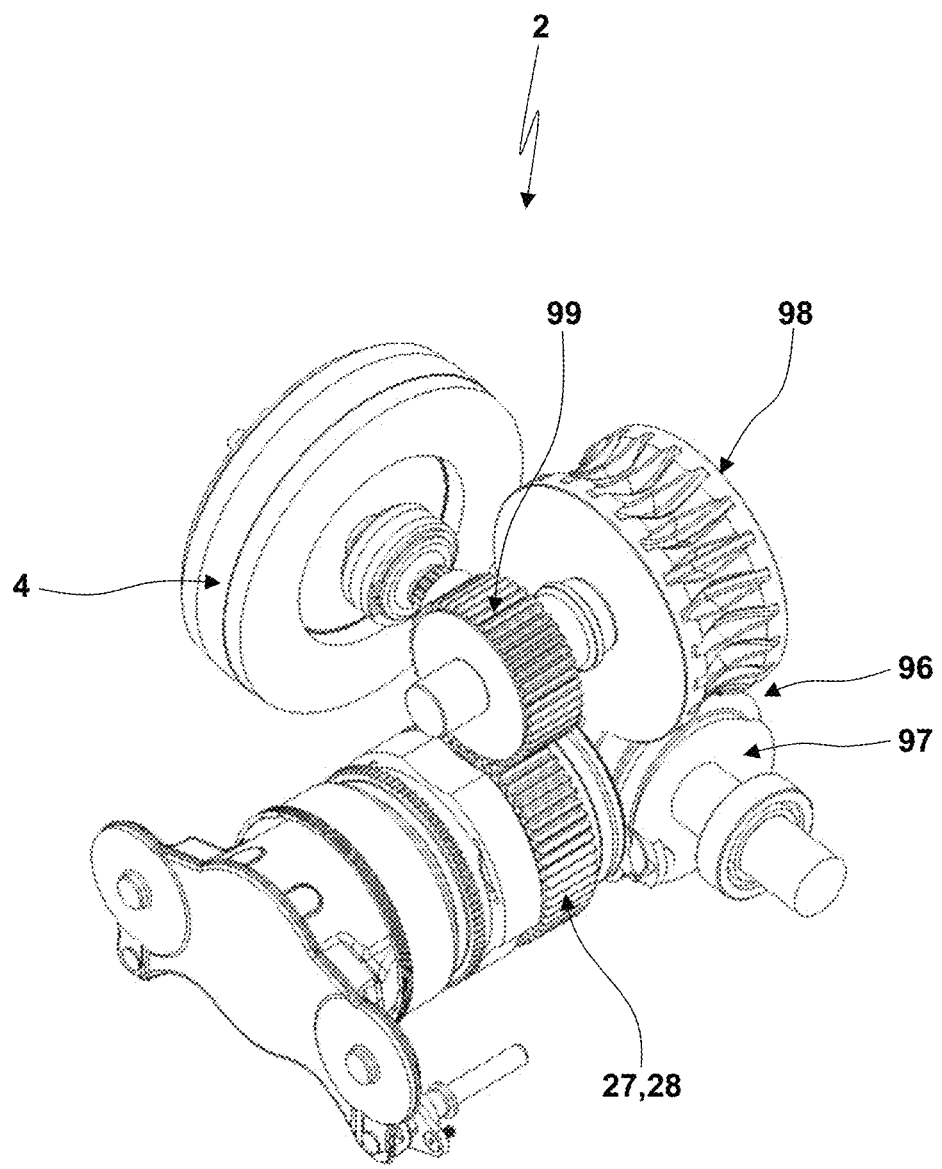
FIG. 12 shows the disc brake actuator of FIG. 11 in a three-dimensional view from another view point.

For the embodiment shown in FIGS. 11 and 12 instead of a planetary gear set 10 as the further transmission unit 9 a worm transmission unit 96 is used. Here, the electrical drive 4 directly drives a worm screw 97. The worm screw 97 meshes with a worm wheel 98 which is rigidly coupled to a gear wheel 99 which meshes with the driving gear wheel 28. The further constructional elements and the following force flow correspond to the embodiment shown in FIG. 3.

For an alternative embodiment instead of a planetary gear set 10 or a worm transmission unit 96 as the further transmission unit 9 also a cycloidal drive might be used (here not shown; cp. e.g. the publication of the company SUMITOMO (SHI) Cyclo Drive Germany GmbH named "fine cyclo-zero/speed reducers; spielfreie Getriebe", catalogue 999016/en/de-03/2011 or the website http://lcamtuf.coredump.cx/cycloid/).

For the shown embodiment, the axis of the worm wheel 98 (and of the gear wheel 99) is arranged parallel to the direction of movement of the thrust plate 17. Instead, the rotational axis of the worm screw 97 and the rotational axis of the electric drive 4 have an orientation perpendicular to the direction of movement of the thrust plate. Accordingly, it is possible to position the electric drive 4 in longitudinal direction of the vehicle in front of or behind the ramp transmission system 12, the threaded transmission system 13 and the thrust plate 17, in particular in front or behind the disc brake actuator 2. This might be positive for the installation aspect. The selected position of the electric drive 4 in front of or behind the other components might be mirrored for the right hand side and the left hand side of the vehicle.

In FIGS. 11 and 12 an electric drive having a large diameter is shown which leads to a compact design of the electric drive 4 in its axial direction. The person with skill in the art will understand that it is also possible to use an electric drive 4 having a smaller radial dimension but a larger axial dimension.

A used cycloidal drive or worm transmission unit 96 might be self-locking so that no further locking mechanism will be needed.

Figure 4:
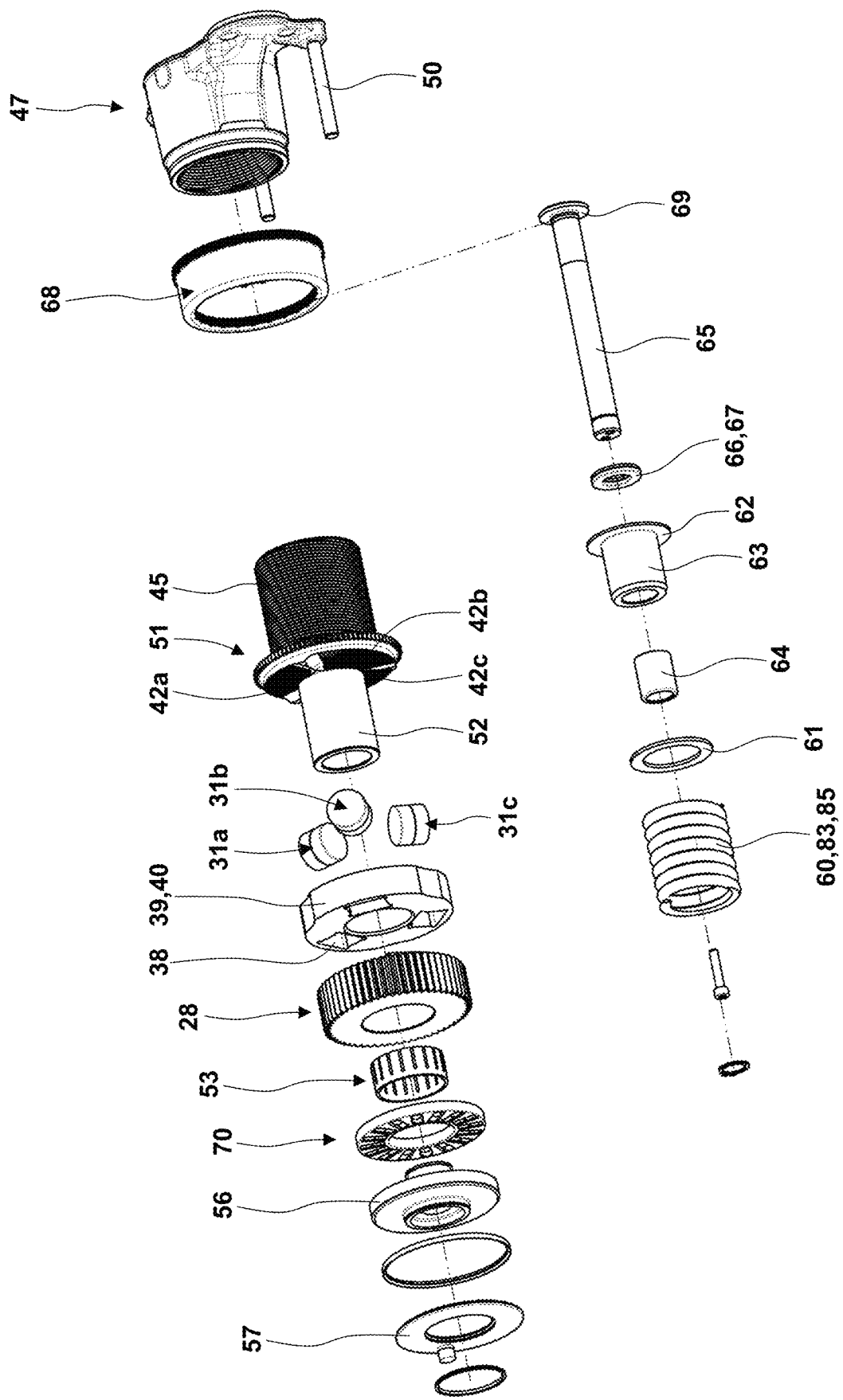
FIG. 4 shows an exploded view of the transmission unit of FIG. 3.
Figure 5:
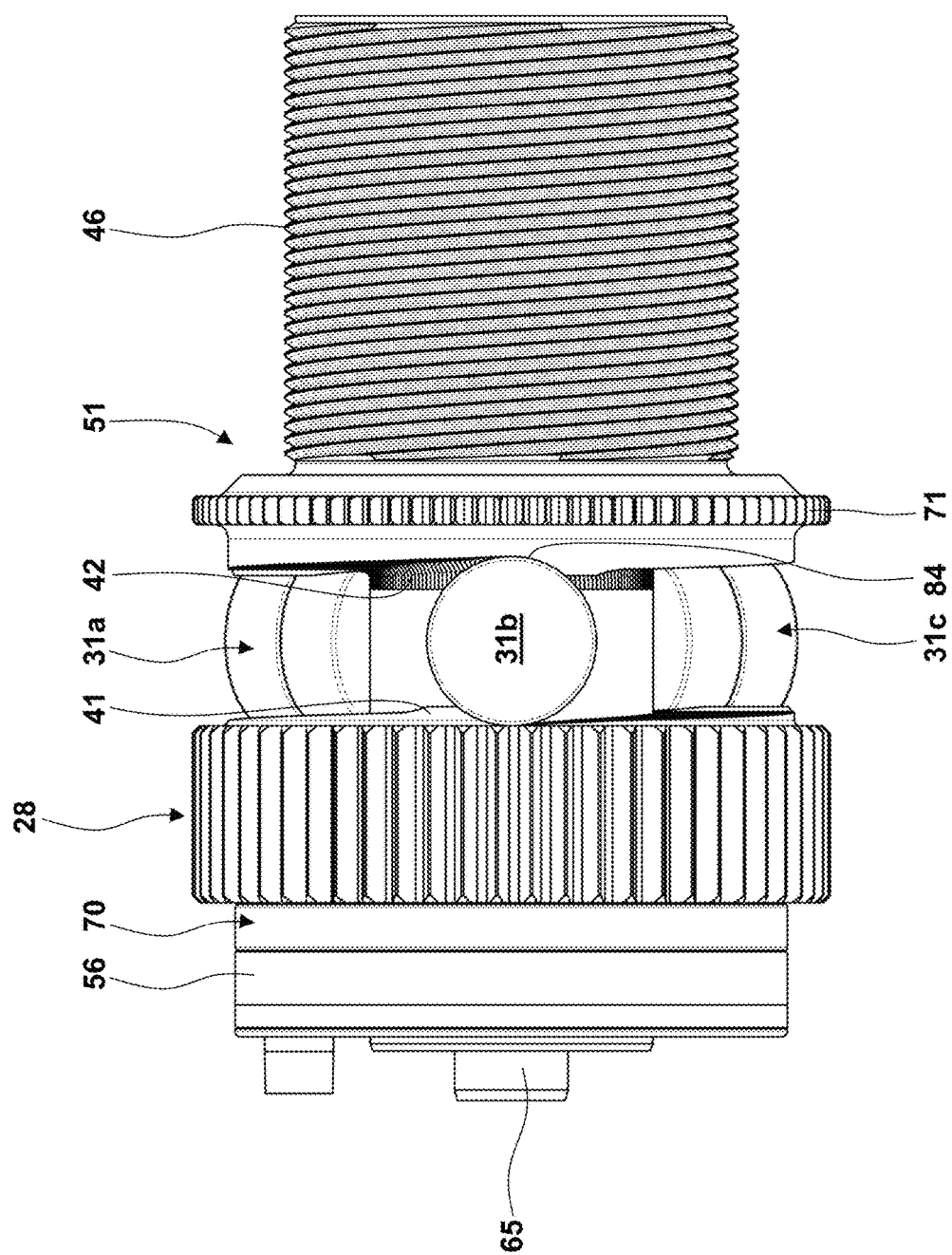
FIG. 5 shows a side view of a part of the transmission unit of FIGS. 3 and 4.

As shown in FIG. 4, the threaded driven element 47 and the thrust plate 17 can be secured against rotation by the guiding rods 50 for preventing rotation of the thrust plate 17 when the thrust plate 17 is no longer in contact with the brake pad. For an alternative embodiment, the thrust plate 17 itself might have a protrusion that fits with a pad retainer and prevents rotation of the thrust plate 17 when the thrust plate 17 is no longer in contact with the brake pad. This might be useful in particular during reset of the brake for exchanging worn out brake pads.

A brake calliper might have a design without a finger-side, i.e. an outer part of the calliper holding the outer brake pad. It is possible that the calliper is made in two parts. In this case, the outer part of the calliper is bolted on the calliper housing which is shown in the figures. However, it is also possible that the brake calliper is manufactured as one single piece.

The stepped sleeve 51 forming the gear wheel 71 (which might also be named a cog wheel) for rewinding the mechanism might also be exchanged with a cylindrical sliding ring (not shown) which slidingly supports the mechanism against the housing (either alone or in cooperation with the connection between the thrust plate 17 and the brake pad). In such case, another means for resetting the brake needs to be arranged at a new position, potentially adjacent said sliding ring. This can then also be used for a brake pad wear sensor.

Many variations and modifications may be made to the preferred embodiments of the invention without departing substantially from the spirit and principles of the invention. All such modifications and variations are intended to be included herein within the scope of the present invention, as defined by the following claims.

I claim:

1. A disc brake actuator for a vehicle with an electrical drive and a transmission unit driven by the electrical drive, the transmission unit comprising a ramp transmission system and a threaded transmission system,
   wherein the ramp transmission system and the threaded transmission system are arranged in series in the force flow of the transmission unit,
   wherein the ramp transmission system comprises
   a) a rotating driving element having a fixed axial position and being driven by the electrical drive,
   b) a driven element which is both movable in an axial direction as well as rotatable and
   c) a rolling element which is clamped between the driving element and the driven element and rolls along contact surfaces of the driving element and the driven element,
   d) wherein the contact surface of the driving element as well as the contact surface of the driven element each form a ramp, at least one of the ramps having portions of different inclinations in different circumferential portions, the different inclinations located in different parts of a brake stroke, and wherein the inclination of the at least ramp continuously decreases in the circumferential direction over the brake stroke.

2. The disc brake actuator of claim 1 wherein the threaded transmission system is arranged downstream from the ramp transmission system.

3. The disc brake actuator of claim 1 wherein
   a) a brake stroke of the disc brake actuator for applying a brake an actuation of the electrical drive
      first operates the threaded transmission system and
      then operates the ramp transmission system and/or
   b) in a return brake stroke of the disc brake actuator for releasing the brake a return actuation of the electrical drive
      first operates the ramp transmission system and
      then operates the threaded transmission system.

4. The disc brake actuator of claim 3 wherein the ramp transmission system is biased by a spring which does not bias the threaded transmission system.

5. The disc brake actuator of claim 3 wherein a switching from the operation of the threaded transmission system to the operation of the ramp transmission system and/or vice versa is automatically triggered by
   a friction in the threaded transmission system,
   a rolling resistance due to the inclinations of the ramps in the ramp transmission system and/or
   a spring biasing the ramp transmission system towards a starting point of the ramps.

6. The disc brake actuator of claim 1 wherein the driving element is a gearwheel and the contact surface forming one of the ramps is a front surface of the gearwheel, the gearwheel comprising a radial outer surface with teeth.

7. The disc brake actuator of claim 1 wherein the rolling element is a double-roller which is in particular accommodated in a cage element.

8. The disc brake actuator of claim 7 wherein the roller is disc-shaped and comprises
   a) a bevelled transition surface,
   b) a curved front surface and/or
   c) a rolling surface having a curved contour.

9. The disc brake actuator of claim 1 wherein the driven element of the ramp transmission system is fixedly connected to a threaded driving element of the threaded transmission system.

10. The disc brake actuator of claim 9 wherein the driven element of the ramp transmission system and the threaded driving element of the threaded transmission system are integrally formed by a sleeve wherein the contact surface of the driven element of the ramp transmission system is formed by a ring-shaped radial shoulder of the sleeve and a thread of the threaded driving element is formed by an outer or inner surface of the sleeve.

11. The disc brake actuator of claim 1 wherein an axial supporting force of the ramp transmission system in axial direction is sensed by an axial force sensor.

12. The disc brake actuator of claim 1 wherein an axial supporting force of the ramp transmission system in axial direction is sensed by an axial force sensor.

13. The disc brake actuator of claim 1 wherein the threaded transmission system comprises
    a) a rotatable threaded driving element and
    b) a threaded driven element, which is fixed against rotation, wherein
    c) the threaded driving element and the threaded driven element are threaded with each other and
    d) the threading angle between the threaded driving element and the threaded driven element changes with a rotation of the threaded driving element.

14. The disc brake actuator of claim 13 wherein the threaded driving element of the threaded transmission system is biased by a torsional spring.

15. The disc brake actuator of claim 14 wherein the application of a torque of the torsional spring is controlled by a sliding clutch mechanism, a uni-directional clutch mechanism, a one-way needle roller or a one-way wrap spring.

16. The disc brake actuator of claim 1 wherein the transmission unit is driven by the electrical drive via a further transmission unit.

17. The disc brake actuator of claim 16 wherein the further transmission unit comprises a planetary gear set, a cycloidal drive or a worm transmission unit.

18. The disc brake actuator of claim 17 wherein
    a) a planet carrier of the planetary gear set is fixed against relative rotation to a gearwheel meshing with the gearwheel of the transmission unit and
    b) a sun gear of the planetary gear set is driven by the electrical drive.

19. The disc brake actuator of claim 1 wherein a fixing unit is provided for fixing an operational state of the disc brake actuator independent on the energization of the electrical drive.

20. The disc brake actuator of claim 1 wherein a sensor is integrated into the disc brake actuator and the sensor senses an operational state of the threaded transmission system.

21. The disc brake actuator of claim 8 wherein a sensor is integrated into the disc brake actuator and the sensor senses an operational state of the threaded transmission system.

22. The disc brake actuator of claim 17 wherein a sensor is integrated into the disc brake actuator and the sensor senses an operational state of the threaded transmission system.

23. The disc brake actuator of claim 18 wherein a sensor is integrated into the disc brake actuator and the sensor senses an operational state of the threaded transmission system.

24. A disc brake actuator for a vehicle with an electrical drive and a transmission unit driven by the electrical drive, the transmission unit comprising a ramp transmission system and a threaded transmission system,
   wherein the ramp transmission system and the threaded transmission system are arranged in series in the force flow of the transmission unit,
   wherein the ramp transmission system comprises
   a) a rotating driving element having a fixed axial position and being driven by the electrical drive,
   b) a driven element which is both movable in an axial direction as well as rotatable and
   c) a rolling element which is clamped between the driving element and the driven element and rolls along contact surfaces of the driving element and the driven element,
   d) wherein the contact surface of the driving element as well as the contact surface of the driven element each form a ramp, at least one of the ramps having portions of different inclinations in different circumferential portions, the different inclinations located in different parts of a brake stroke, and wherein the portions of the at least one ramp with smaller inclinations are arranged in a circumferential direction at positions used in operating states of the brake disc where a more sensitive control of the brake force is desired.

25. A disc brake actuator for a vehicle with an electrical drive and a transmission unit driven by the electrical drive, the transmission unit comprising a ramp transmission system and a threaded transmission system,
   wherein the ramp transmission system and the threaded transmission system are arranged in series in the force flow of the transmission unit,
   wherein the ramp transmission system comprises
   a) a rotating driving element having a fixed axial position and being driven by the electrical drive,
   b) a driven element which is both movable in an axial direction as well as rotatable and
   c) a rolling element which is clamped between the driving element and the driven element and rolls along contact surfaces of the driving element and the driven element,
   d) wherein the contact surface of the driving element as well as the contact surface of the driven element each form a ramp, at least one of the ramps having portions of different inclinations in different circumferential portions, the different inclinations located in different parts of a brake stroke, and wherein the at least one ramp in a first portion starts with a constant large inclination, then in a second portion the inclination continuously decreases to a smaller inclination and then the ramps comprise a constant small inclination in the third portion.

\* \* \* \* \*

UNITED STATES PATENT AND TRADEMARK OFFICE
CERTIFICATE OF CORRECTION

PATENT NO. : 10,843,674 B2
APPLICATION NO. : 16/222221
DATED : November 24, 2020
INVENTOR(S) : Lars Mattis Severinsson Page 1 of 1

It is certified that error appears in the above-identified patent and that said Letters Patent is hereby corrected as shown below:

In the Claims

Column 19, Line 34, after "least" and before "ramp" insert --one--.

Signed and Sealed this
Twenty-ninth Day of December, 2020

Andrei Iancu
*Director of the United States Patent and Trademark Office*